Feb. 26, 1952 L. SCHWEITZER 2,587,390
MANUALLY OPERABLE CONTROL ASSEMBLY
Filed Jan. 30, 1950
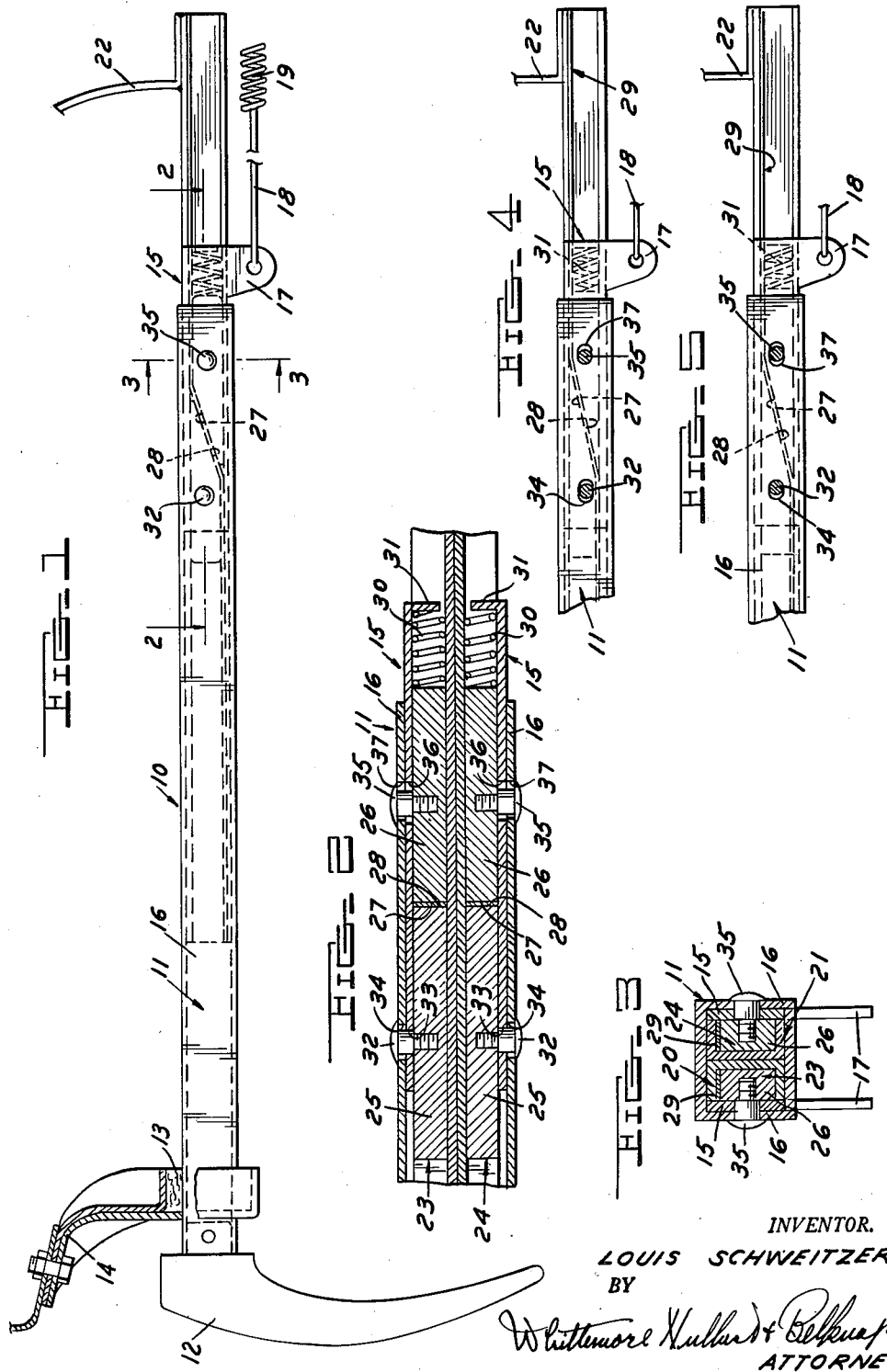
INVENTOR.
LOUIS SCHWEITZER
BY
ATTORNEYS

UNITED STATES PATENT OFFICE 2,587,390

MANUALLY OPERABLE CONTROL ASSEMBLY

Louis Schweitzer, Royal Oak, Mich., assignor to Motor Products Corporation, Detroit, Mich., a corporation of New York Application January 30, 1950, Serial No. 141,247

11 Claims. (Cl. 74—531)

This invention relates generally to manually operable control devices, and refers more particularly to improvements in hand operated control assemblies of the type commonly used in vehicles for operating the service brakes.

It is an object of this invention to provide a control device which may be manipulated with a minimum effort on the part of the user, and incorporates wedge type locking means for securely holding the same in any desired adjusted position.

It is a further object of this invention to provide a hand operated control assembly capable of being installed in a relatively small space and composed of a relatively few simple parts of a design which enables them to be inexpensively manufactured and assembled.

The foregoing as well as other objects will be made more apparent as this description proceeds, especially when considered in connection with the accompanying drawing, wherein:

Figure 1 is a side elevational view partly in section of a hand operated control assembly embodying the features of this invention;

Figure 2 is a longitudinal sectional view taken on the line 2—2 of Figure 1;

Figure 3 is a cross sectional view taken on the line 3—3 of Figure 1;

Figure 4 is a fragmentary elevational view showing the parts of the control assembly in the relative positions they assume when the control is released; and Figure 5 is a view similar to Figure 4 showing the relative position of the parts during movement of the control toward its operative position.

The control assembly selected for the purpose of illustrating the present invention is especially designed for installation on a vehicle, and is particularly adapted for connection to the service brakes of the vehicle. However, it will be understood as this description proceeds that the control assembly may be used in practically any instance where it is desired to not only manually operate a suitable mechanism, but to also securely hold the mechanism in its applied or operated position.

With the above in view, reference is now made more in detail to the drawing, wherein the numeral 10 designates a hand operated control assembly having an elongated tubular operating member 11 and having a handle 12 secured in any suitable manner to the outer end of the member 11. The member 11 is supported on a bracket 13 for sliding movement in opposite directions and the bracket 13 has an attaching flange 14 which may be secured to any suitable part of the equipment in connection with which the control assembly is used.

As shown particularly in Figure 3 of the drawing, the member 11 is rectangular in cross sectional area, and is open at the inner end. A pair of operated elements 15 in the form of elongated strips are supported within the tubular member 11 adjacent the opposite side walls 16 of this member. The inner ends of the elements 15 project beyond the corresponding end of the tubular member 11, and are formed with lugs 17. The lugs 17 are connected by a member 18 to a suitable load shown in Figure 1 of the drawing in the form of a spring 19.

Referring again to Figure 3 of the drawing, it will be noted that a pair of guides 20 and 21 in the form of channel-shaped strips are supported within the tubular member 11 between the elements 15. The guides are positioned in back to back relationship, so that the channels open laterally outwardly toward the respective elements 15. The inner ends of the guides extend for a substantial distance beyond the inner end of the tubular member 11, and are secured to a bracket 22, which in turn, may be attached to any suitable part of the equipment in connection with which the control assembly is employed.

A pair of locking devices 23 and 24 are respectively slidably supported within the guides between the base portions of the channels and the operated elements 15. Each locking device comprises an outer wedge 25 and an inner wedge 26. The inner and outer wedges of each locking device are positioned in alignment within their respective guides and the adjacent end portions thereof are formed with overlying wedging surfaces 27 and 28. As shown particularly in Figures 1, 4 and 5, the wedging surfaces of each pair of wedges extend obliquely across the respective guides so that relative movement of the wedges toward one another causes the outer sides of the wedges to jam against the adjacent side walls of the channels and thereby lock the devices 23 and 24 against sliding movement relative to their respective channels.

The outer sides of each pair of wedges are frictionally positioned in sliding contact with the adjacent walls of the respective channels by a pair of relatively thin, flexible strips 29. The strips 29 are respectively located in the channels of the guides 20 and 21. The opposite ends of each strip are respectively secured to the opposite sides of the associated channel shaped guide substantially beyond the wedges, and the intermediate portions of these strips respectively extend between the wedging surfaces of the two pairs of wedges. Thus the flexible strips 29 hold the wedges of the locking devices in their proper positions relative to the wedge guides and assure trouble-free operation of the wedges.

Referring now to Figure 2 of the drawing, it will be noted that the inner wedges 26 of each pair are yieldably urged toward their respective outer wedges 25 by coil springs 30. The outer ends of the coil springs 30 are arranged to abut the inner ends of the respective wedges 26 and the inner ends of the coil springs 30 engage lugs 31 formed on the operated elements 15.

The outer wedges 25 are provided with headed pins 32 which extend laterally outwardly from the respective wedges through registering openings 33 and 34 formed in the elements 15 and adjacent walls 16 of the tubular member 11. The diameter of the openings 33 in the elements 15 approximates the diameter of the pin, so that the elements 15 move as a unit with the outer wedges 25. The openings 34 in the walls 16 of the member 11 are elongated in order to provide for limited sliding movement of the outer wedges 25 relative to the member 11.

The inner wedges 26 are also provided with a pair of headed pins 35 which respectively project laterally outwardly through registering openings 36 and 37 formed in the elements 15 and walls 16 of the member 11. The openings 36 and 37 are elongated in the direction of length of the member 11, and the length of the openings 36 exceeds to some extent the length of the openings 37.

When the parts are in the relative positions shown in Figure 2 of the drawing, the control assembly or device is in its released position shown in Figure 1 of the drawing. Thus when it is desired to apply the brake or other mechanism connected to the control device, the user merely grasps the handle 12 and pulls the member 11 in an outward direction. Movement of the member 11 in an outward direction engages the inner sides of the openings 34 in the walls 16 of the member with the pins 32 in the manner noted in Figure 5 of the drawing. Thus continued outward movement of the member 11 is transferred through the pins 32 to the operated elements 15 and to the outer wedges 25. Inasmuch as the openings 36 and 37 are elongated in the direction of movement of the member 11, the wedges 25 are moved outwardly relative to the inner wedges 26 and the wedging surfaces are separated. However, due to the action of the springs 30 on the inner ends of the wedges 26, the latter follow the outer wedges 25 and maintain the wedging surfaces in such close proximity that as soon as the pulling force applied to the member 11 is discontinued, the wedging surfaces again coact to effectively lock the elements 15 against return movement by the action of the load or spring 19. It follows therefore that the control assembly may be easily moved to its applied position by merely exerting an outward pull on the member 11, and is securely held in any desired adjusted position as soon as the user releases the pulling force on the member 11.

When it is desired to release the operated elements 15, the user merely applies a pushing force on the member 11. The relationship between the elongated openings 34 and 37 in the member 11 is such that a slight inward movement of this member engages the outer ends of the openings 37 with the pins 35 on the inner wedges 26 before the outer ends of the elongated openings 34 engage the pins 32 on the wedges 25, as shown in Figure 4 of the drawing. Thus continued inward movement of the member 11 is transferred to the wedges 26, and the latter are moved sufficiently away from the wedges 25 to separate the wedging surfaces. As soon as the wedging surfaces are separated, the locking devices are released from their respective channel guides, and the elements 15 together with the load or mechanism connected to the elements 15 are moved to the inoperative positions thereof.

Thus from the foregoing, it will be noted that the control assembly is instantaneously locked in any applied position by merely releasing the pulling force applied to the operating member 11. It will also be noted that the locking means is practically instantaneously released by merely exerting a slight pushing force on the operating member 11. It will further be understood that the above results are obtained with a construction composed of a relatively few parts capable of being inexpensively manufactured, assembled and installed.

What I claim as my invention is:

1. A manually operable control device comprising an elongated guide having laterally spaced side walls, an operating member movable relative to the guide in opposite directions lengthwise of the latter, an operated element movable relative to the operating member lengthwise of the guide, load means normally urging the element in an inward direction toward its inoperative position, a locking device comprising inner and outer wedges slidably supported on the guide between the side walls and having adjacent generally parallel wedging surfaces extending obliquely across the guide from one side to the other, means connecting the outer wedge to the operated element whereby the wedging surface on the outer wedge is urged toward the wedging surface on the inner wedge by the load means to jam the wedges against the side walls of said guide, means on the operating member for moving the outer wedge in a direction away from the inner wedge upon outward movement of said member, and means also on the operating member for moving the inner wedge in a direction away from the outer wedge upon inward movement of the member.

2. The manually operable control device set forth in claim 1 in which yieldable means is provided between the operated element and inner wedge for urging the inner wedge in a direction toward the outer wedge.

3. The manually operable control device set forth in claim 1 in which an elongated flexible strip is secured to opposite sides of the guide substantially beyond the ends of the locking device and has an intermediate portion which extends between the wedging surfaces of the wedges and acts on the wedges to maintain the latter in contact with opposite sides of the guide.

4. The manually operable control device set forth in claim 1, in which the operating member is tubular in cross section and has a hand engaging part at the outer end, and in which the guide and operated element extend into said member.

5. A manually operable control device comprising an elongated guide having laterally spaced side walls, an operating member movable relative to the guide in opposite directions lengthwise of said guide, an operated element movable relative to the operating member lengthwise of the guide, a locking device comprising inner and outer wedges slidably supported in alignment on the guide between the side walls thereof and having adjacent wedging surfaces extending obliquely across the guide, a part extending laterally from the outer wedge through registering openings in said member and element, the opening in said member being of a size to enable sliding movement of the outer wedge relative thereto and the opening in said element being of a size to coact with said part in connecting the outer wedge to the element for movement as a unit with the latter, means normally urging the element in an inward direction toward its inoperative position to thereby move the wedging surface on the outer wedge toward the wedging surface on the inner wedge, a second part extending laterally from the inner wedge through an enlarged opening in the member, the relationship between the enlarged openings in said member and the respective parts being such that outward movement of the member engages the part on the outer wedge with the inner side of the registering opening in said member and inward movement of the member engages the part on the inner wedge with the outer side of the registering opening in the operating member.

6. The manually operable control device set forth in claim 5 having yieldable means for urging the inner wedge in a direction toward the outer wedge and having an elongated flexible strip secured at opposite ends to opposite sides of the guide substantially beyond the ends of the locking device and provided with an intermediate portion extending between the wedging surfaces of the wedges.

7. A manually operable control device comprising a pair of elongated guides channel-shaped in cross section and arranged back to back with the channels opening laterally outwardly, an operating member movable relative to the guide in opposite directions lengthwise of the guide, a pair of operated elements movable relative to the operating member lengthwise of the guide and respectively positioned at the open sides of the channels, means normally urging the operated elements in an inward direction toward their inoperative positions, a pair of locking devices respectively slidably supported in said channels, each locking device having inner and outer substantially aligned wedges provided with overlying wedging surfaces at adjacent ends, means respectively connecting the outer wedges to the operated elements whereby the wedging surfaces on the outer wedges are urged toward the wedging surfaces on the inner wedges by the first named means, a connection between the operating member and outer wedges for moving the latter in a direction away from the inner wedges upon outward movement of said member, and a second connection between the operating member and the inner wedges for moving the latter in a direction away from the outer wedges upon inward movement of the operating member.

8. The manually operable control device set forth in claim 7 having yieldably means acting upon the inner wedges for urging the latter toward the outer wedges, and elongated flexible strips respectively located in the channels with the intermediate portions extending between the adjacent wedging surfaces and with the opposite ends respectively secured to the operated elements beyond the locking devices.

9. The manually operable control device set forth in claim 7 in which the operating member has a tubular cross section, and in which the guides and operated elements extend into said operating member.

10. A manually operable control device comprising a tubular operating member, a pair of guides channel-shaped in cross section and positioned within the tubular member in back to back relation with the channels opening laterally outwardly, a pair of aligned inner and outer wedges slidably supported in each guide and having overlying wedging surfaces at adjacent ends extending obliquely across the guide, yieldable means normally urging the wedges of each pair toward one another, a connection between the outer wedges of each pair and the operating member for moving the outer wedges in a direction away from the inner wedges upon outward movement of the said member, and a second connection between the operating member and inner wedges of each pair for moving the inner wedges in a direction away from the outer wedges upon inward movement of the operating member.

11. The manually operable control device set forth in claim 10 in which an operated element is connected to the outer wedges of each pair for movement as a unit with the latter wedges and in which means is provided for normally urging the operating element in an inward direction.

LOUIS SCHWEITZER.

REFERENCES CITED

The following references are of record in the file of this patent:

UNITED STATES PATENTS

| Number | Name | Date |
|---|---|---|
| 843,253 | Barker | Feb. 5, 1907 |
| 1,398,262 | Gray | Nov. 29, 1921 |
| 1,764,937 | DeBonal et al. | June 17, 1930 |
| 2,037,261 | Nenninger | Apr. 14, 1936 |
| 2,205,987 | McCarthy | June 25, 1940 |

FOREIGN PATENTS

| Number | Country | Date |
|---|---|---|
| 654,254 | France | Oct. 10, 1927 |